(12) United States Patent
Harnefors et al.

(10) Patent No.: US 9,461,473 B2
(45) Date of Patent: Oct. 4, 2016

(54) METHOD AND APPARATUS FOR DAMPING OSCILLATIONS IN A POWER SYSTEM

(71) Applicant: ABB TECHNOLOGY LTD, Zürich (CH)

(72) Inventors: Lennart Harnefors, Eskilstuna (SE); Lidong Zhang, Västerås (SE); Nicklas Johansson, Västerås (SE)

(73) Assignee: ABB TECHNOLOGY LTD, Zürich (CH)

( * ) Notice: Subject to any disclaimer, the term of this patent is extended or adjusted under 35 U.S.C. 154(b) by 0 days.

(21) Appl. No.: 15/023,898

(22) PCT Filed: Oct. 3, 2013

(86) PCT No.: PCT/EP2013/070631
§ 371 (c)(1),
(2) Date: Mar. 22, 2016

(87) PCT Pub. No.: WO2015/049005
PCT Pub. Date: Apr. 9, 2015

(65) Prior Publication Data
US 2016/0218510 A1    Jul. 28, 2016

(51) Int. Cl.
*H02J 3/36* (2006.01)
*H02J 3/24* (2006.01)

(52) U.S. Cl.
CPC ... *H02J 3/24* (2013.01); *H02J 3/36* (2013.01)

(58) Field of Classification Search
None
See application file for complete search history.

(56) References Cited

U.S. PATENT DOCUMENTS

| 7,518,266 B2* | 4/2009 | Eckroad | H02J 3/02 307/19 |
| 8,736,112 B2* | 5/2014 | Linden | H02J 1/12 307/102 |

FOREIGN PATENT DOCUMENTS

| CN | 102801152 A | 11/2012 |
| EP | 1 919 054 A2 | 5/2008 |
| WO | WO 2012/000548 A1 | 1/2012 |
| WO | WO 2012/000549 A1 | 1/2012 |

* cited by examiner

*Primary Examiner* — Jared Fureman
*Assistant Examiner* — Aqeel Bukhari
(74) *Attorney, Agent, or Firm* — Birch, Stewart, Kolasch & Birch, LLP

(57) ABSTRACT

Embodiments disclose using a pairing or pairings of terminals in a DC power system including a plurality of terminals to implement power oscillation damping (POD), where the DC power system is connectable to at least one AC power system. The active and/or reactive power of the terminals in the pairing may be controlled or modulated in a similar manner such that no power imbalance in the DC power system is created. For example, POD may be implemented by means of active and/or reactive power modulation by pairing two terminals in the DC power system) such that their active and/or reactive powers are controlled or modulated in the same or substantially the same manner or identically but with the opposite sign.

24 Claims, 4 Drawing Sheets

METHOD AND APPARATUS FOR DAMPING OSCILLATIONS IN A POWER SYSTEM

TECHNICAL FIELD

The present invention generally relates to power systems such as electrical power distribution or transmission systems, e.g. High Voltage Direct Current (HVDC) power transmission systems. Specifically, the present invention relates to a method in a Direct Current (DC) power system connectable to at least one Alternating Current (AC) power system for conveying power between at least two locations in the at least one AC power system.

BACKGROUND

Power systems such as electrical power distribution or transmission systems are used to supply, transmit and use electric power. High Voltage Direct Current (HVDC) power transmission is becoming increasingly important due to increasing need for power supply or delivery and interconnected power transmission and distribution systems.

Electro-mechanical oscillations between interconnected power-generating machines, e.g. electrical generators, may occur in power systems. Such oscillations, which for example may be oscillations in machine speed and/or frequency, may be referred to as modal oscillations. Oscillations associated with a single machine or generator are often referred to as local modes, which oscillations generally are localized to the machine or generator and the transmission line connecting it to the rest of the power system. Local modes generally have frequencies in the range of 1-2 Hz. Oscillations associated with groups of machines or generators are often referred to as interarea modes. Interarea modes generally have frequencies in the range of 1 Hz or less, e.g. between 0.1 Hz and 0.8 Hz. Interarea mode oscillations may for example involve two coherent groups of machines or generators which are swinging against each other. Interarea mode oscillations generally involve a great number of parts or portions of the power system and are generally characterized by a highly non-linear behavior. Interarea oscillations may for example be triggered by power system disturbances, such as faults occurring in the power system, switchings, and/or sudden changes in power generation and/or loads in the power system.

In point-to-point (PTP) HVDC power transmissions, two Alternating Current (AC)/Direct Current (DC) converter terminals interconnected by at least one transmission line, e.g., an underground cable and/or an overhead line, are employed. PTP HVDC power transmissions have since the 1980's been used to damp modal oscillations in power systems. Damping or reducing modal oscillations in power systems may be referred to as power oscillation damping (POD). Local modes are usually damped by means of so called power system stabilizers (PSSs), which may provide a sufficient damping of such modes. For interarea mode oscillations, it is in general desired or even required that sufficient damping of such oscillations can be performed in a relatively short amount of time, for example in a few tens of seconds or less. 'Sufficient' damping of interarea mode oscillations may for example mean that the oscillations are damped such that their amplitude falls below some threshold value.

SUMMARY

An HVDC grid or a DC grid may comprise multiple AC/DC converter terminals interconnected by transmission lines, e.g., underground cables and/or overhead lines. Within the HVDC or DC grid, a terminal may be connected to multiple terminals, resulting in different types of topologies. HVDC transmissions typically bridge relatively long distances, and are therefore suited for damping of interarea oscillations, e.g. caused by two (or more) geographical areas or regions with groups or clusters of synchronous machines which oscillate against each other, usually with a frequency of less than 1 Hz. Unlike interarea oscillations, which often are relatively difficult to damp, local oscillations can in general be sufficiently damped by means of employing power system stabilizers (PSSs).

In PTP HVDC transmissions, power oscillation damping (POD) may be carried out by means of modulating the active power of the HVDC transmission, or active power output from one of the terminals, e.g., utilizing a speed or frequency of a generator in the vicinity of one of the terminals as a feedback or input signal for carrying out the modulation. In alternative or in addition information extracted e.g. from the phase-locked loop (PLL) of a HVDC control system may be utilized for carrying out the modulation. Each terminal may be selectively controllable with respect to power conveyed from and/or received by the terminal. At each terminal the active power output from the terminal may be modulated. In the future however it is likely that multiterminal DC (MTDC) grids will be used, for example in order to reinforce the transmission system and allow for increased usage of renewable energy sources such as wind.

One HVDC technique employs line-commutated current source converters (CSCs) with thyristor valves. Such converters may require a relatively strong synchronous voltage source for operation. In line-commutated CSC HVDC transmission only the active power may be available for modulation. For voltage-source converter (VSC) HVDC transmission on the other hand, in addition to the capability to control the active power the reactive power can be independently controlled and hence modulated. VSC HVDC transmission is based on VSC and insulated gate bipolar transistors (IGBT), where the converter operates with high frequency pulse width modulation (PWM) and therefore has the capability to relatively rapidly control or adjust both the active and reactive power independently of each other. Since load-commutated CSC HVDC transmissions may require polarity change of the direct voltage for power reversal, and also since VSCs may be required for connection to passive or relatively weak AC power systems, relevant for e.g. wind farms, VSC HVDC transmissions may be more useful than CSC HVDC transmissions and even required for implementation of meshed HVDC grids.

With increasing usage of MTDC grids it is expected that the complexity of the design of POD control will be increased. This is because that unlike PTP HVDC transmissions there may be a relatively large number of combinations in an MTDC grid of how the active power can be distributed among the terminals. The complexity may increase with the number of terminals added to the MTDC grid. One way of implementing POD in MTDC grids is to modulate the active power of the terminal which is 'electrically closest' to one of the areas or regions which participate in the interarea oscillation (i.e. the terminal for which the reactance between the terminal and the one of the areas or regions which participate in the interarea oscillation is a minimum compared to the reactance between the other terminal and the one of the areas or regions which participate in the interarea oscillation). The power injected in the MTDC grid at that terminal is distributed among the other terminals by means of the so called primary controls of the respective ones of the other terminals. However, it would be beneficial to be able to increase the efficiency in performing POD in MTDC grids.

In view of the above, a concern of the present invention is to provide a method in a DC power system comprising a plurality of terminals and being connectable to at least one AC power system comprising a plurality of power generating machines, which method is capable of achieving an increased efficiency in damping of any oscillation between power generating machines in at least two different regions of the at least one AC power system.

A further concern of the present invention is to provide a method in a DC power system comprising a plurality of terminals and being connectable to at least one AC power system comprising a plurality of power generating machines, which method is capable of achieving an increased efficiency in damping of any oscillation between power generating machines in at least two different regions of the at least one AC power system, and such that the damping is decoupled from the so called primary controls of the terminals.

To address at least one of these concerns and other concerns, a method, a processing unit, a computer program product and a DC power system in accordance with the independent claims are provided. Preferred embodiments are defined by the dependent claims.

According to a first aspect, there is provided a method in a DC power system which comprises a plurality of terminals or stations. Each terminal is coupled to at least one other terminal, and each terminal is configured to convey power to and/or receive power from the at least one other terminal, e.g. via at least one power transmission line. Each terminal is selectively controllable with respect to power conveyed from, and possibly also received by, the terminal. The DC power system is connectable to at least one AC power system comprising a plurality of power generating machines, e.g. electrical generators, which machines may be synchronous with respect to each other. The DC power system is adapted to convey power between at least two locations in the at least one AC power system. The method comprises, on a condition that the at least one AC power system comprises at least two different regions wherein the electrical generators in the respective regions at least potentially can oscillate against each other, determining at least one pairing of two subsets of the plurality of terminals, wherein each subset includes at least one terminal. The at least one pairing of two subsets of the plurality of terminals is determined by means of a model of dynamics of a power system representative of at least a portion of the DC power system and the at least two different regions of the at least one AC power system. Power conveyed from at least one subset of the two subsets of terminals is controlled, or modulated, such that a difference between the total power output from the respective subsets of terminals complies with a selected power difference criteria. Thereby, any oscillation between the power generating machines in the respective regions can be damped.

For example, the at least one pairing of two subsets of the plurality of terminals may be determined on basis of reactance between each of the plurality of terminals and predetermined positions representative of the locations of the respective regions, and the locations of the plurality of terminals relatively to the at least one AC power system.

In alternative or in addition, the at least one pairing of two subsets of the plurality of terminals may be determined for example by means of determining, for each of a plurality of possible pairings of two subsets of the plurality of terminals, a modal residue vector corresponding to a selected mode of oscillation between the power generating machines in the respective regions, based e.g. on a state space model a power system representative of at least a portion of the DC power system and the at least two different regions of the at least one AC power system. This will be described further in the following.

By a power system representative of at least a portion of the DC power system and the at least two different regions of the at least one AC power system it may be meant a model of the entire DC power system and the at least two different regions of the at least one AC power system, or a power system which represents, or is similar to or the same, a portion of the combined system of the DC power system and the at least two different regions of the at least one AC power system.

The method may further comprise determining, e.g. by means of some control and/or monitoring system, that the at least one AC power system comprises at least two different regions wherein the electrical generators in the respective regions at least potentially can oscillate against each other.

There may be predetermined positions representative of locations of the respective regions. In alternative or optionally, the method may further comprise determining positions which are representative of locations of the respective regions.

The selected power difference criteria may for example be or include that the magnitudes of the total power output (active and/or reactive) from the respective subsets of terminals are the same.

Embodiments of the present invention are based on that instead of implementing POD in MTDC grids by control, adjustment, or modulation of the active power of the terminal which is 'electrically closest' to one of the areas or regions which participate in an interarea oscillation and letting any power imbalance in the MTDC grid be handled by e.g. the primary controls of the terminals such that the power injected in the MTDC grid at the terminal whose active power is modulated is distributed among the other terminals, a pairing or pairings of terminals in the MTDC grid may be used to implement POD. The active and/or reactive power of the terminals in the pairing may be modulated in a similar manner, e.g. utilizing a wide area control system (WACS), such that no power imbalance in the MTDC grid is created. For example, POD may be implemented by means of active power modulation by pairing two terminals in the MTDC grid such that their active powers are modulated in the same or substantially the same manner or identically but with the opposite sign. According to an example, reference or feedback signal(s) for the active power modulation can be transmitted to the terminal(s) by means of a WACS or the like.

The choice of terminals to be included in the pairing of terminals, for which terminals power conveyed from the terminals is controlled or modulated such that a difference between the total power output from the terminals complies with a selected power difference criteria, can for example be based on the arrangement of terminals relatively to the at least one AC power system or network. For example, if all terminals are embedded in the same AC network, then the terminals which are closest to the centers of the areas in the AC network which oscillate against each other (i.e. the areas in the AC network for which the power generating machines, e.g. electrical generators, in the respective areas oscillate or swing, e.g. with respect to speed and/or frequency thereof, against each other) may be paired. This case will be referred to in the following as parallel damping. The same principle may apply for an AC network with at least one external terminal and one or more embedded terminals, provided that the embedded terminals are located in relative symmetry to the oscillating areas in the AC network. According to another example, if at least one terminal is external and the embedded terminal or terminals are located with a relatively high degree of asymmetry relatively to the oscillating areas, then one (or possibly two or more) of the external terminals may be paired with the selected embedded terminal which is closest to either one of the oscillating areas. This case will be referred to in the following as perpendicular damping. If there are two or more external terminals, two (or more) of them can be modulated in tandem against the selected embedded terminal in a perpendicular damping in order to prevent, or reduce, the induction of oscillations in the AC network.

According to another example, the choice of terminals to be included in the pairing of terminals, for which terminals power conveyed from the terminals is controlled or modulated such that a difference between the total power output from the terminals complies with a selected power difference criteria, may in alternative or in addition for example be based on determination of modal residue vectors corresponding to a selected mode of oscillation between the power generating machines in the respective regions, which modal residue vectors may be determined for at least some of the possible pairings of terminals that may be made. This will be further described in the following.

It has been found that by using a pairing or pairings of terminals in the DC power system an increased efficiency in damping of any oscillation between power generating machines in at least two different regions of the at least one AC power system may be achieved, and possibly that variations in the direct voltage in the DC power system can be reduced or even minimized.

It has further been found that by using a pairing or pairings of terminals in the DC power system, damping of any oscillation between power generating machines in at least two different regions of the at least one AC power system may become decoupled from the so called primary controls of the terminals, which for example may be or include HVDC terminals.

Compared to implementing POD in the DC power system by control or modulation of the power of the terminal which is 'electrically closest' to one of the areas or regions which participate in an interarea oscillation, and letting any power imbalance in the DC power system grid be handled by e.g. the primary controls of the terminals such that the power injected in the DC power system at the terminal whose power is controlled or modulated is distributed among the other terminals, the impact of controlling or modulating power conveyed from the two subsets of the pairing of terminals may be easier to analyze.

In general, the DC power system may comprise at least three terminals, although according to embodiments of the present invention the DC power system may comprise two terminals only.

Each terminal may configured to convey active and/or reactive power to, and/or receive active and/or reactive power from, at least one other terminal. Each terminal of the plurality of terminals may be selectively controllable with respect to active and/or reactive power conveyed from the terminal. The terminals may for example be based on VSC HVDC technology and may hence in addition to the capability to control the active power also have the capability to control the reactive power, independently from the control of active power, and hence modulate active power and/or reactive power independently of each other.

The DC power system is adapted to convey power between at least two locations in the at least one AC power system, e.g. between at least two locations in different ones of two or more AC power systems, and/or between two locations in the same AC power system.

By the at least one AC power system comprising at least two different regions, wherein the power generating machines (e.g., comprising electrical generators) in the respective regions (possibly at least momentarily) at least potentially can oscillate or swing, e.g. with respect to speed and/or frequency thereof, against each other, it is meant that there is (potentially) an interarea oscillation in the at least one AC power system. In the context of the present application, by the term "oscillating", e.g. with respect to a quantity such as speed and/or frequency, it is meant that the quantity varies in time between alternate extremes, usually within a certain period of time.

The at least two different regions which may be comprised in the at least one AC power system wherein the electrical generators in the respective regions at least potentially can oscillate against each other, may without limitation be referred to in the following as oscillating regions or oscillating areas.

The positions representative of locations of the respective regions, or oscillating regions, may for example comprise positions indicative or representative of center points of the respective regions.

According to an embodiment of the present invention, by inertia of a power generating machine such as an electrical generator, it is meant the rotational energy stored in the rotating machine, or rotor, of the machine. The speed of one power generating machine may vary synchronously with the speed of the rotating machines of the other power generating machines.

According to an embodiment of the present invention, by a subset of the plurality of terminals it is meant a 'proper subset' of the plurality of terminals, i.e. a subset of the plurality of terminals that is a subset of the plurality of terminals but not equal to it.

According to an embodiment of the present invention, the two subsets of the at least one pairing of two subsets of the plurality of terminals are different subsets (i.e. non-overlapping) of the plurality of terminals.

According to a second aspect, there is provided an apparatus, e.g. a processing unit, for controlling a DC power system comprising a plurality of terminals. Each terminal in the DC power system is coupled to at least one other terminal and configured to convey power to and/or receive power from the at least one other terminal, and each terminal is selectively controllable with respect to power conveyed from the terminal. The DC power system is connectable to at least one AC power system comprising a plurality of power generating machines, the DC power system being adapted to convey power between at least two locations in the at least one AC power system. The processing unit is configured to, on a condition that the at least one AC power system comprises at least two different regions wherein the power generating machines in the respective regions at least potentially can oscillate against each other:

determine at least one pairing of two subsets of the plurality of terminals, each subset including at least one terminal, and control power conveyed from at least one subset of the two subsets of terminals such that a difference between the total power output from the respective subsets of terminals complies with a selected power difference criteria, thereby damping any oscillation between the power generating machines in the respective regions.

The processing unit is configured to determine the at least one pairing of two subsets of the plurality of terminals by means of a model of dynamics of a power system representative of at least a portion of the DC power system and the at least two different regions of the at least one AC power system. The model may for example be based on reactance between each of the plurality of terminals and predetermined positions representative of the locations of the respective regions and the locations of the plurality of terminals relatively to the at least one AC power system.

According to a third aspect, there is provided a computer program product which is adapted to be executed in a processing unit configured to control DC power system which comprises a plurality of terminals. Each terminal in the DC power system is coupled to at least one other terminal and configured to convey power to and/or receive power from the at least one other terminal, and each terminal is selectively controllable with respect to power conveyed from the terminal. The DC power system is connectable to at least one AC power system comprising a plurality of power generating machines, the DC power system being adapted to convey power between at least two locations in the at least one AC power system. The computer program product comprises computer-readable means carrying computer program code configured to, when executed in the processing unit, and on a condition that the at least one AC power system comprises at least two different regions wherein the power generating machines in the respective regions at least potentially can oscillate against each other:

determine at least one pairing of two subsets of the plurality of terminals, each subset including at least one terminal, and control power conveyed from at least one subset of the two subsets of terminals such that a difference between the total power output from the respective subsets of terminals complies with a selected power difference criteria, thereby damping any oscillation between the power generating machines in the respective regions.

The computer program product comprises computer-readable means carrying computer program code configured to, when executed in the processing unit, determine the at least one pairing of two subsets of the plurality of terminals by means of a model of dynamics of a power system representative of at least a portion of the DC power system and the at least two different regions of the at least one AC power system. The model may for example be based on reactance between each of the plurality of terminals and predetermined positions representative of the locations of the respective regions, and the locations of the plurality of terminals relatively to the at least one AC power system.

According to a fourth aspect, there is provided a DC power system including a plurality of terminals, each terminal being coupled to at least one other terminal and configured to convey power to and/or receive power from the at least one other terminal, and each terminal being selectively controllable with respect to power conveyed from the terminal. The DC power system further includes a processing unit. The DC power system is connectable to at least one AC power system comprising a plurality of power generating machines, the DC power system being adapted to convey power between at least two locations in the at least one AC power system. The processing unit is configured to, on a condition that the at least one AC power system comprises at least two different regions wherein the power generating machines in the respective regions at least potentially can oscillate against each other:

determine at least one pairing of two subsets of the plurality of terminals, each subset including at least one terminal, and control power conveyed from at least one subset of the two subsets of terminals such that a difference between the total power output from the respective subsets of terminals complies with a selected power difference criteria, thereby damping any oscillation between the power generating machines in the respective regions.

The processing unit is configured to determine the at least one pairing of two subsets of the plurality of terminals by means of a model of dynamics of a power system representative of at least a portion of the DC power system and the at least two different regions of the at least one AC power system. The model may for example be based on reactance between each of the plurality of terminals and predetermined positions representative of the locations of the respective regions, and the locations of the plurality of terminals relatively to the at least one AC power system.

The DC power system may for example comprise a HVDC power transmission system and/or a DC power grid.

According to one example, power conveyed from both of the two subsets of terminals may be controlled such that a difference between the total power output from the respective subsets of terminals complies with a selected power difference criteria.

In the context of the present application, for a case where a subset of terminals includes more than one terminal, control of power conveyed from a subset of terminals encompasses both the case where the total power output from all of the terminals in the subset is controlled and the case where the power output from the respective terminals in the subset are individually controlled, possibly so as to control the total power output from the subset.

For controlling power conveyed from both of the two subsets of terminals such that a difference between the total power output from the respective subsets of terminals complies with a selected power difference criteria a control signal may according to an example be communicated to each of the subsets, or each of the terminals included in the respective subsets of terminals.

According to another example, power conveyed from only one first subset of the two subsets of terminals may controlled. At least one terminal of the other, second subset of the two subsets of terminals may be configured to control DC voltage in the DC power system, e.g. by means of appropriately configuring the primary control settings of the at least one terminal, such that controlling power conveyed from the one subset of the two subsets of terminals causes power to flow along a route in the DC power system between the two subsets of terminals. By configuring at least one terminal of one of the subsets to control DC voltage in the DC power system and controlling or modulating power conveyed from the other subset, any power imbalance in the DC power system caused by the control or modulation of power conveyed from one subset may be absorbed by the at least one terminal of the other subset which controls DC voltage in the DC power system, which in turn may direct power to flow on a path or route between the two subsets of terminals in the DC power system. According to this example, communication of a control signal to each of the subsets of terminals in order to achieve that a difference between the total power output from the respective subsets of terminals complies with a selected power difference criteria may not be needed.

According to another example, the at least one terminal in the second subset of the two subsets of terminals may be configured to control DC voltage in the DC power system on a condition that a magnitude of a difference between the DC voltage in the DC power system and a predefined DC voltage reference value does not exceed a DC voltage threshold value. At least one other terminal, which is another terminal than a terminal included in the first subset and the at least one terminal in the second subset, may be configured to selectively adjust its output DC voltage responsive to change in power conveyed from the at least one terminal, or vice versa. On a condition that a magnitude of a difference between the DC voltage in the DC power system and the predefined DC voltage reference value exceeds the DC voltage threshold value, the at least one other terminal may be configured to adjust its output DC voltage responsive to change in power conveyed from the at least one other terminal, or vice versa. By the adjustment of output DC voltage responsive to change in power conveyed from the at least one other terminal, or vice versa, the at least one other terminal may contribute to the controlling of DC voltage in the DC power system, which DC voltage further may be controlled by the at least one terminal in the second subset of the two subsets of terminals, as discussed above.

Similarly to the example described in the paragraph immediately above, at least one terminal of the second subset of the two subsets of terminals may be configured to control DC voltage in the DC power system, e.g. by means of appropriately configuring the primary control settings of the at least one terminal, and power conveyed from the first subset of the two subsets of terminals may be controlled or modulated, while at least one, or even all, of (any) other terminals for example may operate with power-DC voltage droop control when the DC voltage in the DC power system is outside a selected interval about a selected voltage reference value. Such a selected interval may be referred to as DC voltage deadband. When the DC voltage in the DC power system is within the selected interval or deadband, the at least one terminal of the second subset may control DC voltage in the DC power system. However, when the DC voltage in the DC power system is outside the selected interval, any terminals which operate with voltage droop control may also contribute to the control of the DC voltage in the DC power system. Droop control may not require any communication between the terminals, or converters. According to an example of voltage droop control, a controller ensures a linear or substantially linear relationship between the DC bus voltage and the active power or DC current output of the converter station.

The model of dynamics of a power system representative of at least a portion of the DC power system and the at least two different regions of the at least one AC power system may for example be based on a state space model and/or a frequency domain model.

As mentioned above, the model may for example be based on reactance between each of the plurality of terminals and predetermined positions representative of the locations of the respective regions, and the locations of the plurality of terminals relatively to the at least one AC power system. However, determination of the at least one pairing of two subsets of the plurality of terminals may be performed in a number of ways. According to an example, a plurality of possible pairings of two subsets of the plurality of terminals may be determined. For each of the possible pairings of two subsets of the plurality of terminals, a modal residue vector, which corresponds to a selected mode of oscillation between the power generating machines in the respective regions, may be determined. The determined modal residue vectors may then be compared with each other, on basis of which comparison the determination of the at least one pairing of two subsets of the plurality of terminals then may be made. This will be further described in the following with reference to example embodiments of the present invention.

Since power systems may be continuously changing e.g. their topology, load levels and generation patterns in ways that may be more or less unpredictable, a way of extracting or constructing a model of the power system, and in particular a model of dynamics of a power system representative of at least a portion of the DC power system and the at least two different regions of the at least one AC power system, which relies relatively little or even not at all on direct information of the different power system parameters. To this end, numerical algorithms for subspace state-space system identification (N4SID) may be useful. A power system model may be implemented for example using the time-domain simulation software DigSilent PowerFactory, which is produced by DigSILENT GmbH, Heinrich-Hertz-Strasse 9, 72810 Gomaringen, Germany. For example, in order to construct a power system model from the DC power system connections to the output, or measurement points, in the at least one AC power system, the following steps may be used:

(i) Excite the time-domain simulation model with a pseudo-random binary signal (PRBS) at each terminal active and/or reactive power output(s). The PRBS amplitude may for example be chosen as 0.01 p.u. of the lowest terminal MVA rating. The PRBS frequency range may for example be from 0.6 Hz to 1.2 Hz. Excitation may be applied for a predefined period of time, e.g. about 60 s.

(ii) Collect the resulting input data (e.g., machine or generator speed or some other parameter of the machines or generators) at a number of selected machine or generator nodes in the at least one AC power system.

(iii) Perform system identification for the selected input-output combination, generating a state space model on A, B, C form with the input signals in the vector u and the output signals in the vector y:

$$\partial x/\partial t = Ax + Bu,$$

$$y = Cx.$$

System identification may for example be performed using Matlab, produced by MathWorks.

For a state space model:

$$\partial x/\partial t = Ax + Bu,$$

$$y = Cx,$$

the eigenvalues and eigenvectors of A can be calculated such that $$Av_k = \lambda_k v_k$$

$$w_k^T A = \lambda_k w_k^T$$

$$w_k^T v_k = 1$$

$\lambda_k$ is the $k^{th}$ eigenvalue with the corresponding right and left eigenvectors $v_k$ and $w_k$, respectively. The closed loop transfer function matrix J(s) from u to y can be expanded in terms of the residue matrices $R_k$ corresponding to the different eigenvalues $\lambda_k$:

$$J(s) = \Sigma_k(R_k/(s-\lambda_s))$$

$$R_k = \lim_{s \to \lambda_k} [J(s)/(s-\lambda_s)]$$

The residue matrix $R_k$ corresponding to a specific eigenvalue $\lambda_k$ can in alternative or optionally be determined as $$R_k = C v_k w_k^T B$$

Ranking of the different possible pairings of terminals in terms of the effectiveness with respect to damping a certain mode of oscillation, or modal oscillation, for the respective pairings can be performed for example as follows:

1) Assume there are n terminals in the DC power system. Determine the number of possible pairing combinations of the n terminals or stations in the DC power system. The number of possible combinations $n_v$ is in general:

$$n_v = n!/[2!(n-2)!]$$

2) Consider each of these pairings as a 'virtual' input signal u, while ensuring that the power modulation or control signals used for each pairing are in balance.

3) Excite each of the possible virtual input signals u separately in a time-domain simulation of the power system and determine the effect on the considered possible output signals y.

4) Based on the data of one of the terminals in each pairing and the different possible output signals, estimate or construct a power system model e.g. using N4SID.

5) Analyze the eigenvalues of the A matrix in the power system model to find the mode of oscillation which is desired to be damped.

6) Determine the modal residue vector of this mode of oscillation. The variation of the data in the modal residue vector may be taken as a measure or indication of the effectiveness of the different possible output signals in damping of the mode of oscillation.

7) Repeat steps 3-6 above for all, or at least some or most, pairings of terminals. In order to compare the different modal residue vectors with each other, the same amplitude of the excitation signal may be used for each excitation such that all virtual signals u will have the same or substantially the same amplitude.

According to another example, the pairing of the two subsets may be determined by means of selecting the two subsets such that reactance between at least one terminal in at least one of the subsets and the (possibly predetermined) positions representative of the locations of the respective regions is a minimum as compared to reactance between each of the plurality of terminals and the positions representative of the locations of the respective regions. Hence, the pairing of the two subsets may for example be determined by means of determining a terminal to be included in the pairing as one that is being located electrically closest to a position representative of the location of one of the regions, e.g. the center of the region.

According to another example, in case all of the terminals are included in the (a) same AC power system or network, the pairing of the two subsets of terminals may be constituted by those terminals which are located electrically closest to the centers of the oscillating regions.

In the context of the present application, by a terminal being 'electrically closest' to a position, compared to other terminals, it is meant the terminal for which the reactance between the terminal and the position is a minimum compared to the reactance between any of the other terminals and the position.

For example, on a condition that all terminals are included in a same of the at least one AC power system, determining at least one pairing of two subsets of the plurality of terminals may comprise selecting at least a first terminal to be included in one of the two subsets and a second terminal to be included in the other one of the two subsets, wherein reactance between the first terminal and the position representative of the location of one of the respective regions is a minimum as compared to reactance between the other terminals and the position representative of the location of the one of the respective regions, and reactance between the second terminal and the position representative of the locations of the other one of the respective regions is a minimum as compared to reactance between the other terminals and the position representative of the location of the other one of the respective regions. Controlling, or modulating, power conveyed from the at least one subset of the two subsets of terminals thus selected such that a difference between the total power output from the respective subsets of terminals complies with a selected power difference criteria, whereby any oscillation between the power generating machines in the respective regions is damped, may be referred to as 'parallel' damping.

The plurality of terminals may according to an example comprise at least three terminals. At least two terminals may be included in a same of the at least one AC power system, and at least one other terminal may be located externally with respect to the at least one AC power system. The respective reactances between the at least two terminals included in a same of the at least one AC power system and the location of one of the respective regions, and the respective reactances between the at least two terminals included in a same of the at least one AC power system and the position representative of the locations of the other one of the respective regions may comply with a selected similarity criteria. According to this example, the determining of at least one pairing of two subsets of the plurality of terminals may comprise selecting at least a first terminal to be included in one of the two subsets and a second terminal to be included in the other one of the two subsets, with the first terminal and the second terminals being included in the same of the at least one AC power system (i.e. so as to implement or realize 'parallel' damping such as mentioned above), and wherein reactance between the first terminal and the position representative of the location of one of the respective regions is a minimum as compared to reactance between the other terminals and the position representative of the location of the one of the respective regions, and reactance between the second terminal and the position representative of the locations of the other one of the respective regions is a minimum as compared to reactance between the other terminals and the position representative of the location of the other one of the respective regions.

The similarity criteria may for example be that the respective reactances between the at least two terminals included in a same of the at least one AC power system and the location of one of the respective regions correspond to the respective reactances between the at least two terminals included in a same of the at least one AC power system and the position representative of the locations of the other one of the respective regions.

For example, if there is at least one terminal which is arranged externally with respect to the at least one AC power system, but where the terminals which are included in the same AC power system or network are located with relative symmetry to the oscillating regions, then the pairing of the two subsets of terminals may be constituted by those terminals, of the terminals which are included in the same AC power system or network, that are located electrically closest to the positions representative of the locations of the respective regions, e.g. the centers of the oscillating regions.

However, if there is at least one terminal which is arranged externally with respect to the at least one AC power system, but where the AC power system is asymmetric with respect to the terminals and the oscillating regions (e.g. the terminals which are included in the AC power system or network are located within or close to one of the oscillating areas), then the pairing of the two subsets of terminals may be constituted by the terminal, of the terminals which are included in the same AC power system or network, that is located electrically closest to the positions representative of the locations of the respective regions (e.g. the centers of the oscillating regions), and the at least one terminal which is arranged externally with respect to the at least one AC power system.

Consider again the example where the plurality of terminals comprises at least three terminals, at least two terminals are included in a same of the at least one AC power system, and at least one other terminal is located externally with respect to the at least one AC power system. In case the respective reactances between the at least two terminals included in a same of the at least one AC power system and the location of one of the respective regions, and the respective reactances between the at least two terminals included in a same of the at least one AC power system and the position representative of the locations of the other one of the respective regions does not comply with a selected similarity criteria, the determination of at least one pairing of two subsets of the plurality of terminals may comprise selecting at least a first terminal to be included in one of the two subsets and a second terminal to be included in the other one of the two subsets, the first terminal being one of the at least two terminals which are included in the same of the at least one AC power system and the second terminal being one of the at least one other terminal which is located externally with respect to the at least one AC power system. Controlling, or modulating, power conveyed from the at least one subset of the two subsets of terminals thus selected such that a difference between the total power output from the respective subsets of terminals complies with a selected power difference criteria, whereby any oscillation between the power generating machines in the respective regions is damped, may be referred to as 'perpendicular' damping.

As mentioned above, the similarity criteria may for example be that the respective reactances between the at least two terminals included in a same of the at least one AC power system and the location of one of the respective regions correspond to the respective reactances between the at least two terminals included in a same of the at least one AC power system and the position representative of the locations of the other one of the respective regions.

Although the above-described examples mainly refer to the case where a pairing of two terminals is used, this is not to be construed as limiting in any way. As indicated in the foregoing, it is contemplated that pairings of terminals such that one or both 'ends' of the pairing includes two or more terminals can be used. For example, in case the plurality of terminals comprises at least four terminals, and on a condition that at least two terminals are included in a same of the at least one AC power system and at least two other terminals are located externally with respect to the at least one AC power system, the determination of at least one pairing of two subsets of the plurality of terminals may comprise selecting a third terminal to be included together with the second terminal in the other one of the two subsets, the third terminal being one other of the at least two other terminals which are located externally with respect to the at least one AC power system. Controlling, or modulating, power conveyed from the at least one subset of the two subsets of terminals thus selected such that a difference between the total power output from the respective subsets of terminals complies with a selected power difference criteria, whereby any oscillation between the power generating machines in the respective regions is damped, may be referred to as tandem operation damping. Hence, for example with respect to 'perpendicular' damping as described in the foregoing, two or more external terminals may be used at one 'end' of the pairing of terminals with the power conveyed from the two or more external terminals being controlled or modulated in tandem. It has been found that such tandem operation may further reduce or even prevent induction of oscillations in the at least one AC power system or network.

In case of outage or non-availability of a terminal, e.g. due to maintenance, replacement, etc., such that a certain pairing of terminals cannot at least momentarily be used, an alternative pairing of terminals may be used.

For example, according to an embodiment of the present invention, in case a plurality of possible pairings of two subsets of the plurality of terminals is determined, performance in damping of any oscillation between the power generating machines in the respective regions by means of controlling power conveyed from the at least one subset of the two subsets of terminals of each possible pairing, such that a difference between the total power output from the respective subsets of terminals complies with the selected power difference criteria, may be assessed, for example by means of at least one power system simulation model. On basis of the assessment, the plurality of possible pairings of two subsets of the plurality of terminals may be ranked according to assessed performance in damping of any oscillation between the power generating machines in the respective regions by means of controlling power conveyed from the at least one subset of the two subsets of terminals of each possible pairing. On basis of the ranking, a ranking list or table or the like may be determined. By means of the at least one power system simulation model a suitable or even the most suitable pairing of terminals with respect to AC power system and/or DC power system architecture and/or layout, and the type(s) of interarea oscillations in the AC power system desired to alleviate or eliminate, may be determined. The at least one power system simulation model may for example be a power system simulation model included in DigSILENT PowerFactory, produced by DigSILENT GmbH, Heinrich-Hertz-Strasse 9, 72810 Gomaringen, Germany, or a similar software package.

A first signal may be received (e.g. by the processing unit), which may be indicative of at least one parameter of a power generating machine in at least one of the regions. The at least one parameter of the power generating machine may for example be a parameter which governs the power generation capability of the power generating machine. Controlling or modulating power conveyed from the at least one subset of the two subsets of terminals may be based on the first signal. Hence, the first signal may be used as a 'feedback' signal for control or modulation of the power.

The received signal may for example be indicative of at least one parameter of a power generating machine in one of the regions for which the aggregated inertia of the power generating machines in the region is a minimum with respect to the aggregated inertias of the power generating machines in the respective regions. This is due to that a relatively small power generating machine (i.e. with a relatively small inertia) may tend to swing with greater amplitudes during a system disturbance than a larger power generating machine, i.e. a power generating machine having a larger inertia.

In the context of the present application, by a region for which the aggregated inertia of the power generating machines in the region is a minimum it is meant that a sum of the inertia of all of the power generating machines in the region is a minimum. This usually implies that that region is the region, or one of the regions, with the least amount of installed generated power.

The at least one parameter may for example comprise at least one of speed and/or frequency, and/or rotor angle.

The first signal may for example be received from the power generating machine itself of which the first signal indicates at least one parameter. In alternative or in addition the first signal may for example be received from some appropriate controller of the DC power system and/or AC power system.

In alternative or in addition a second signal may be received (e.g. by the processing unit), which may be indicative of at least one operational parameter of at least one terminal in at least one of the subsets. Controlling power conveyed from the at least one subset of the two subsets of terminals may be based on the second signal. Hence, the second signal may in alternative or in addition be used as a 'feedback' signal for control or modulation of the power.

The second signal may for example be received from the at least one terminal itself of which the second signal indicates at least one operational parameter. In alternative or in addition the second signal may for example be received from some appropriate controller of the DC power system.

The second signal may for example be or include an instantaneous frequency measured by a phase-locked loop (PLL) or another control system of the terminal, an AC frequency measured at the terminal, and/or another parameter measured at the terminal.

For receiving and/or transmitting signals between entities in the DC power system and/or the at least one AC power system, wired and/or wireless couplings or communication pathways as known in the art may be employed.

Each terminal of the plurality of terminals may be selectively controllable with respect to active and/or reactive power conveyed from the terminal.

Controlling power conveyed from the at least one subset of the two subsets of terminals such that a difference between the total power output from the respective subsets of terminals complies with a selected power difference criteria may comprise controlling active and/or reactive power conveyed from the at least one subset of the two subsets of terminals such that a difference between the total active and/or reactive power output from the respective subsets of terminals complies with a selected active and/or reactive power difference criteria.

Further objects and advantages of the present invention are described in the following by means of exemplifying embodiments.

It is noted that the present invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

Exemplifying embodiments of the invention will be described below with reference to the accompanying drawings.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the present invention are shown. The present invention may, however, be embodied in many different forms and should not be construed as limited to the embodiments set forth herein; rather, these embodiments are provided by way of example so that this disclosure will convey the scope of the invention to those skilled in the art. Furthermore, like numbers refer to the same or similar elements or components throughout.

Figure 1:
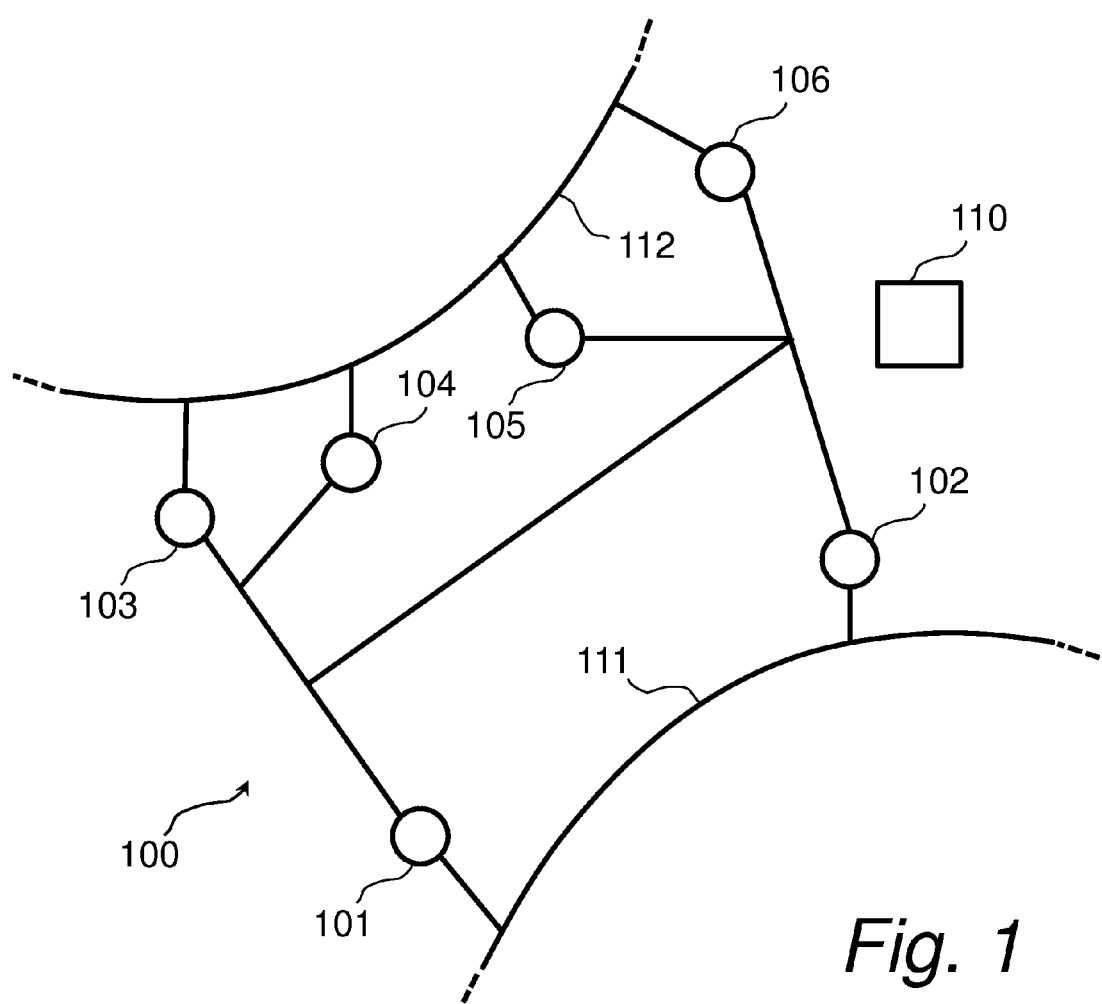
FIG. 1 is a schematic view of a DC power system according to an embodiment of the present invention.

Referring now to FIG. 1, there is shown a schematic view of a DC power system 100 according to an embodiment of the present invention. The DC power system 100 includes a plurality of terminals 101-106. Each terminal 101-106 is coupled to at least one other terminal 101-106, e.g. via at least one power transmission line as indicated in FIG. 1, and configured to convey power to, and/or receive power from, the at least one other terminal 101-106. Each terminal 101-106 is selectively controllable with respect to active and/or reactive power conveyed from the respective terminal 101-106.

The DC power system 100 includes a processing unit 110. The processing unit 110 may for example include or be constituted for example by any suitable central processing unit (CPU), microcontroller, digital signal processor (DSP), Application Specific Integrated Circuit (ASIC), Field Programmable Gate Array (FPGA), etc., or any combination thereof. The processing unit 110 may optionally be capable of executing software instructions stored in a computer program product e.g. in the form of a memory (not shown in FIG. 1). The memory may for example be any combination of read and write memory (RAM) and read only memory (ROM). The memory may comprise persistent storage, which for example can be a magnetic memory, an optical memory, a solid state memory or a remotely mounted memory, or any combination thereof.

The DC power system 100 is connectable to two AC power systems 111, 112, which each comprises a plurality of power generating machines (not shown in FIG. 1). The power generating machines may for example comprise electrical generators. The power generating machines may be synchronous with respect to each other. As illustrated in FIG. 1, the DC power system 100 is adapted to convey power between locations in the AC power systems 111, 112. As also indicated in FIG. 1 the terminals 101-106 are coupled to the AC power systems 111, 112 by means of at least one power transmission line.

The processing unit 110 may be communicatively coupled to at least some of the terminals 101-106, or to each of the terminals 101-106, for communication of e.g. signals and/or data between the processing unit 110 and the respective terminals 101-106. Communicative coupling or communication pathways between the processing unit 110 and at least some of the terminals 101-106 may be wired and/or wireless in a manner known in the art. Communicative coupling or communication pathways between the processing unit 110 and at least some of the terminals 101-106 may for example be based on radio frequency (RF) communication.

The processing unit 110 is configured to, on a condition that at least one of the AC power systems 111, 112 comprises at least two different regions (not shown in FIG. 1) wherein the power generating machines in the respective regions at least potentially can oscillate against each other, and wherein predetermined positions may be representative of locations of the respective regions:

determine at least one pairing of two subsets of the plurality of terminals 101-106, each subset including at least one terminal 101-106, and control power conveyed from at least one subset of the two subsets of terminals 101-106 such that a difference between the total power output from the respective subsets of terminals 101-106 complies with a selected power difference criteria, thereby damping any oscillation between the power generating machines in the respective regions.

The positions representative of locations of the respective regions, or oscillating regions, may for example comprise positions of indicative or representative of center points of the respective regions.

The processing unit 110 is configured to determine the at least one pairing of two subsets of the plurality of terminals 101-106 by means of a model of dynamics of a power system representative of at least a portion of the DC power system 100 and the at least two different regions of the at least one AC power system 111, 112. The model may for example be based on reactance between each of the plurality of terminals 101-106 and the positions representative of the locations of the respective regions, and the locations of the plurality of terminals relatively to the AC power system(s) 111, 112 which comprises the at least two different regions.

The DC power system 100 may for example comprise a HVDC power transmission system and/or a DC power grid.

According to the embodiment depicted in FIG. 1 the number of terminals 101-106 in the DC power system is six. However, in general, the DC power system 110 may comprise at least three terminals, although according to embodiments of the present invention the DC power system 110 may comprise two terminals only. Each terminal 101-106 may be configured to convey active and/or reactive power to, and/or receive active and/or reactive power from, the at least one other terminal 101-106. To this end, the terminals 101-106 may for example be based on VSC HVDC, and may hence in addition to the capability to control the active power also have the capability to control the reactive power, independently from the control of active power, and hence modulate active power and/or reactive power independently of each other.

According to the embodiment depicted in FIG. 1 the DC power system 100 is adapted to convey power between locations in the two AC power systems 111, 112. It is to be understood however that the number of AC power systems 111, 112 depicted in FIG. 1 is according to an example, and that there may for example be only a single AC power system, wherein the DC power system 100 may be adapted to convey power between at least two locations in the AC power system. There may be more than two AC power systems to which the DC power system 100 is connectable.

Figure 2:
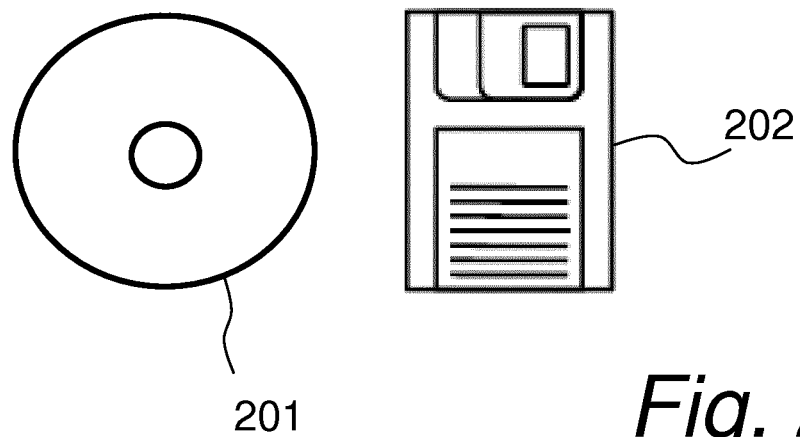
FIG. 2 is a schematic view of computer-readable means carrying computer program code according to embodiments of the present invention.

Referring now to FIG. 2, there is shown a schematic view of computer program products comprising computer-readable means 201, 202 carrying computer program code according to embodiments of the present invention. The computer-readable means 201, 202 or computer program code is adapted to executed in a processing unit configured to control DC power system comprising a plurality of terminals, for example a processing unit such as described in the foregoing e.g. with respect to FIG. 1. Each terminal in the DC power system is coupled to at least one other terminal and configured to convey power to and/or receive power from the at least one other terminal, and each terminal is selectively controllable with respect to power conveyed from the terminal. The DC power system is connectable to at least one AC power system comprising a plurality of power generating machines, the DC power system being adapted to convey power between at least two locations in the at least one AC power system.

Each of the computer-readable means 201, 202 carries computer program code configured to, when executed in the processing unit, and on a condition that the at least one AC power system comprises at least two different regions wherein the power generating machines in the respective regions at least potentially can oscillate against each other and wherein predetermined positions are representative of locations of the respective regions:

determine at least one pairing of two subsets of the plurality of terminals, each subset including at least one terminal, and control power conveyed from at least one subset of the two subsets of terminals such that a difference between the total power output from the respective subsets of terminals complies with a selected power difference criteria, thereby damping any oscillation between the power generating machines in the respective regions.

Each of the computer-readable means 201, 202 carries computer program code configured to, when executed in the processing unit, determine the at least one pairing of two subsets of the plurality of terminals by means of a model of dynamics of a power system representative of at least a portion of the DC power system and the at least two different regions of the at least one AC power system. The model may for example be based on reactance between each of the plurality of terminals and the positions representative of the locations of the respective regions, and the locations of the plurality of terminals relatively to the at least one AC power system.

The computer-readable means 201, 202, or computer readable storage mediums, shown in FIG. 2 include a Digital Versatile Disc (DVD) 201 and a floppy disk 202. Although only two different types of computer-readable means 201, 202 are depicted in FIG. 2, the present invention encompasses embodiments employing any other suitable type of computer-readable means or computer-readable digital storage medium, such as, but not limited to, a nonvolatile memory, a hard disk drive, a CD, a Flash memory, magnetic tape, a USB memory device, a Zip drive, etc.

The processing unit may include or be constituted for example by any suitable CPU, microcontroller, DSP, ASIC, FPGA, etc., or any combination thereof. The processing unit may optionally be capable of executing software instructions stored in a computer program product e.g. in the form of a memory. The memory may for example be any combination of RAM and ROM. The memory may comprise persistent storage, which for example can be a magnetic memory, an optical memory, a solid state memory or a remotely mounted memory, or any combination thereof.

Figure 3:
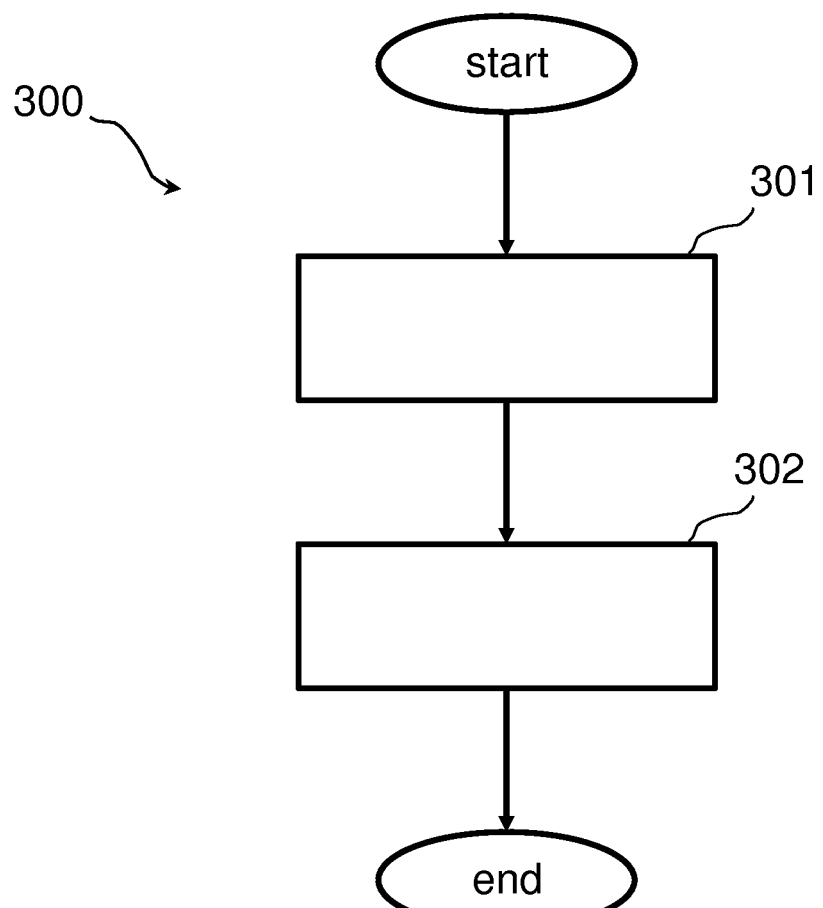
FIG. 3 is a schematic flowchart of a method according to an embodiment of the present invention.

Referring now to FIG. 3, there is shown a schematic flowchart of a method 300 according to an embodiment of the present invention. The method 300 is carried out in a DC power system comprising a plurality of terminals, wherein each terminal is coupled to at least one other terminal and configured to convey power to and/or receive power from the at least one other terminal, and each terminal is selectively controllable with respect to power conveyed from the terminal. The DC power system is connectable to at least one AC power system comprising a plurality of power generating machines. The DC power system is adapted to convey power between at least two locations in the at least one AC power system.

The method 300 comprises, on a condition that the at least one AC power system comprises at least two different regions wherein the power generating machines in the respective regions at least potentially can oscillate against each other:

determining at least one pairing of two subsets of the plurality of terminals, 301, each subset including at least one terminal, and controlling power conveyed from at least one subset of the two subsets of terminals, 302, such that a difference between the total power output from the respective subsets of terminals complies with a selected power difference criteria, thereby damping any oscillation between the power generating machines in the respective regions.

The at least one pairing of two subsets of the plurality of terminals can be determined by means of a model of dynamics of a power system representative of at least a portion of the DC power system and the at least two different regions of the at least one AC power system. For example, the determination of at least one pairing of two subsets of the plurality of terminals may be performed on basis of reactance between each of the plurality of terminals and predetermined positions representative of the locations of the respective regions, and/or the locations of the plurality of terminals relatively to the at least one AC power system.

Figure 4:
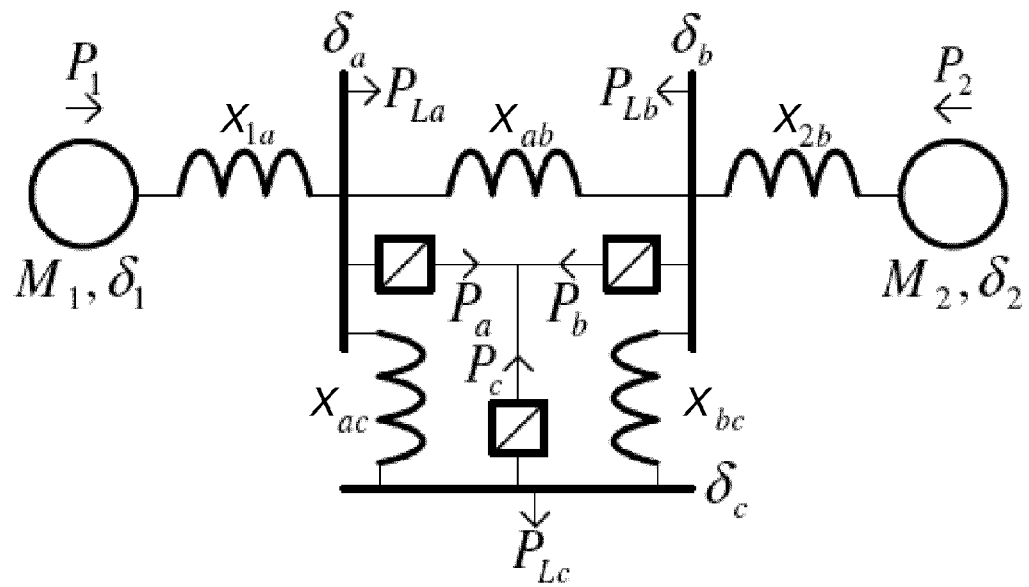
FIGS. 4-6 are schematic conceptual views of power systems for illustrating principles of embodiments of the present invention.

Referring now to FIG. 4, there is shown a schematic conceptual view of a power system for illustrating principles of embodiments of the present invention.

The power system comprises two synchronous machines (generators), with the respective frequency- and pole-pair-scaled inertias $M_1$ and $M_2$. The machines and their busbars are labeled 1 and 2, respectively. The two machines may be considered as aggregations of several machines, and hence each machine may for example represent a certain geographical area. AC and HVDC transmissions connect the two machines or areas in parallel, and first and second HVDC terminals and their busbars are labeled a and b, respectively. A third HVDC terminal, which together with its busbar is labeled c, is assumed to be located electrically more distant relative to the machines 1 and 2 than HVDC terminals a and b. There are assumed to be loads $P_{La}$, $P_{Lb}$, and $P_{Lc}$ at the HVDC-terminal busbars a, b and c, respectively. For example, machine 1 might represent thermal generation near load centers and machine 2 might represent hydro generation in a sparsely populated region (which would imply that $P_{La} \gg P_{Lb}$), whereas busbar c could be located at a load center without significant local generation.

Even though only two machines are included in the power system depicted in FIG. 4, analytical results yet tend to be difficult to obtain. Therefore, for the purpose of simplifying the description of principles of embodiments of the present invention some assumptions are made, which are described in the following. However, these assumptions do not limit the embodiments of the present invention as described herein in any way.

Dampers (e.g. amortisseur windings or solid pole plates) are neglected, and automatic voltage regulators (AVRs) and power-system stabilizers (PSSs) are also neglected (i.e. they are considered not to be present in the power system depicted in FIG. 4).

The AC and DC transmission systems are approximated as lossless and without energy storage, i.e., power generation of the machines 1 and 2 are equal to or substantially equal to the sum of the loads $P_{La}$, $P_{Lb}$, and $P_{Lc}$ at the HVDC-terminal busbars a, b and c, i.e.

$$P_1 + P_2 = P_{La} + P_{Lb} + P_{Lc}. \tag{1}$$

The loads $P_{La}$, $P_{Lb}$, and $P_{Lc}$ are assumed to be constant. For the HVDC terminals, the sum of the loads at the respective terminals a, b, c is zero: $P_a + P_b + P_c = 0$. This represents a worst-case scenario with regard to damping.

All busbar-voltage magnitudes are assumed constant or substantially constant, and equal or substantially equal. This is a reasonable assumption if all HVDC terminals a, b, c have VSCs operating in AC-bus-voltage control mode, since such operation may act or respond at a time scale faster than the power system dynamics. The machine busbar voltage magnitudes are assumed held constant by AVR(s).

Relatively light loading conditions are assumed, implying that the sine function of the voltage-angle difference between two busbars can be approximated as the voltage-angle difference itself. This facilitates or allows the voltage angles to be solved analytically from a linear set of equations. The power-system dynamics become linear and independent of the load flow.

Machine speed signals (and/or some other appropriate feedback signals) are assumed to be available at the HVDC terminals a, b, c for active-power modulation, e.g. via a WACS, and with negligible communication time delay. The active power of each HVDC terminal a, b, c is assumed to respond instantaneously to a reference change. The lag incurred can be compensated for, e.g., by adding an appropriate phase lead to the damping control.

All HVDC terminals a, b, c are assumed to have equal ratings, implying that they all have the same maximum allowed active-power modulation. The same maximum effective modulation gain $K_{max}$ for the machine-speed feedback is therefore imposed on all stations. Selection of $K_{max}$ is a tradeoff: a higher gain may provide an increased efficiency in interarea-mode damping, but may also provide a higher amplification of measurement noise and other disturbances.

Based on the above assumptions, all busbar-voltage magnitudes are equal or substantially equal with magnitude V, whereas the busbar-voltage angles $\delta_1$, $\delta_2$, $\delta_a$, $\delta_b$, $\delta_c$ are varying. Since inherent damping is assumed to be nonexistent, the ideal swing equation applies for each of the two machines, giving the following fourth-order dynamic system model:

$$M_1(d\omega_1/dt) = P_1 - [V^2 \sin(\delta_1 - \delta_a)]/X_{1a} \tag{2}$$

$$M_2(d\omega_2/dt) = P_2 - [V^2 \sin(\delta_2 - \delta_b)]/X_{2b} \tag{3}$$

$$(d\delta_1/dt) = \omega_1 \tag{4}$$

$$(d\delta_2/dt) = \omega_2 \tag{5}$$

where $\omega_1$ and $\omega_2$ are the respective machine-speed deviations (in electrical radians per second) from the angular synchronous frequency, and $X_{1a}$ and $X_{2b}$ are reactances. Power balance at the HVDC-terminal busbars a, b, c gives the following relations:

$$[V^2 \sin(\delta_1-\delta_a)]/X_{1a}-[V^2 \sin(\delta_a-\delta_b)]/X_{ab}-[V^2 \sin(\delta_a-\delta_c)]/X_{ac}-P_a-P_{La}=0 \quad (6)$$

$$[V^2 \sin(\delta_2-\delta_b)]/X_{2b}-[V^2 \sin(\delta_b-\delta_a)]/X_{ab}-[V^2 \sin(\delta_b-\delta_c)]/X_{bc}-P_b-P_{Lb}=0 \quad (7)$$

$$[V^2 \sin(\delta_a-\delta_c)]/X_{ac}+[V^2 \sin(\delta_b-\delta_c)]/X_{bc}+P_a+P_b-P_{Lc}=0 \quad (8)$$

where $P_a+P_b=-P_c$, and $X_{ab}$ and $X_{bc}$ are reactances.

Based on the above-mentioned assumptions, equations (2)-(8) can be linearized by approximating each sine function by its argument. This allows $\delta_a$, $\delta_b$, $\delta_c$ to be solved for analytically from equations (6)-(8) and substituted in equations (2) and (3).

By assumption, the machine-speed deviations $\omega_1$, $\omega_2$ are available for active-power modulation at each HVDC terminal. Since the response is assumed to be instantaneous, proportional feedback is in general sufficient. All available degrees of freedom are exploited, i.e., the machine-speed deviations $\omega_1$, $\omega_2$ of machines 1 and 2 are both fed to HVDC terminals a and b, where they are multiplied with gains to form $$P_a=P^0_a+\Delta P_a, \Delta P_a=K_{1a}\omega_1+K_{2a}\omega_2 \quad (9)$$

$$P_b=P^0_b+\Delta P_b, \Delta P_b=K_{1b}\omega_1+K_{2b}\omega_2 \quad (10)$$

$$P_c=-(P_a+P_b) \quad (11)$$

where superscript 0 indicates steady-state value and prefix $\Delta$ indicates power modulation. Terminal c is considered to be a 'slave' terminal, i.e. the active-power modulation of terminal c instantaneously matches those of terminals a and b. Such a consideration is made since HVDC transmissions generally have relatively small or negligible internal energy-storage capacity.

The linearization of system formed by equations (2)-(5) (in which the solutions of equations (6)-(8) have been substituted] can be expressed as the state space form Ax with $x=[\omega_1, \omega_2, \delta_1, \delta_2]^T$. The structure of the state matrix (which is a 4×4 matrix) is as follows:

$$[-a_{11}\ a_{12}\ -b_1\ b_1\ a_{21}\ -a_{22}\ b_2\ -b_2\ A=1\ 0\ 0\ 0\ 1\ 0\ 0] \quad (12)$$

where elements $a_{ij}$ and $b_i$ are functions of the system parameters, i.e., reactances, inertias, and power-modulation gains. The characteristic polynomial is $$\det(\lambda I-A)=\lambda[\lambda^3+(a_{11}+a_{22})\lambda^2+(b_1+b_2+a_{11}a_{22}-a_{21}a_{12})\lambda-b_1a_{21}+b_1a_{22}+b_2a_{11}-b_2a_{12}] \quad (13)$$

Elements $a_{ij}$ determine the modal damping; if the power modulation gains in equations (9) and (10) are made zero, then these elements all vanish, and the characteristic polynomial reduces to $$\det(\lambda I-A)=\lambda^2[\lambda^2+b_1+b_2]. \quad (14)$$

That is, there is an eigenvalue pair on the imaginary axis, at $\lambda=\pm j\omega_0$, $\omega_0=(b_1+b_2)^{0.5}$, which represents the interarea mode with angular modal frequency $\omega_0$.

If damping, i.e. active-power modulation, is added, an exact analytic factorization can no longer be obtained, but a relatively good approximative factorization can still be obtained. Suppose that the complex eigenvalue pair acquires a real part −a; henceforth, a will be called the modal damping coefficient. The so achieved modal damping ratio $\zeta=a/\omega_0$ is often just a few percents, i.e. $a \ll \omega_0$. The imaginary parts remain virtually unchanged. In addition, one of the eigenvalues in equation (14) moves from the origin to a location −c, yet near the origin, i.e. $c \ll \omega_0$. Thus, expressed in the newly introduced parameters a and c, the characteristic polynomial can be factorized as $$\det(\lambda I-A)=\lambda(\lambda^2+2a\lambda+b_1+b_2)(\lambda+c). \quad (15)$$

with relatively good accuracy. The modal damping coefficient a can now be expressed in the elements of equation (12) by equating the coefficients of equation (15) with those of equation (13), with the help of two reasonable approximations. Expanding equation (15) yields $$\det(\lambda I-A)=\lambda[\lambda^3+(2a+c)\lambda^2+(2ac+b_1+b_2)\lambda+(b_1+b_2)c]$$
$$\approx \lambda[\lambda^3+(2a+c)\lambda^2+(b_1+b_2)\lambda+(b_1+b_2)c] \quad (16)$$

In the same fashion as the approximation $2ac+b_1+b_2 \approx b_1+b_2$ in equation (16), $b_1+b_2+a_{11}a_{22}-a_{21}a_{12} \approx b_1+b_2$ can be approximated in equation (13). Identification of the coefficients in the polynomials in equations (13) and (16) then yields $$a=[b_1(a_{11}+a_{21})+b_2(a_{12}+a_{22})]/(b_1+b_2) \quad (17)$$

Expressing the matrix elements in equation (12) in the system parameters, the angular modal frequency is found to be $$\omega_0=(b_1+b_2)^{0.5}=\{[V^2(M_1+M_2)(X_{ab}+X_{ac}+X_{bc})]/(M_1M_2S)\}^{0.5} \quad (18)$$

where $$S=X_{ab}(X_{ac}+X_{bc})+(X_{1a}+X_{2b})(X_{ab}+X_{ac}+X_{bc}). \quad (19)$$

High inertias and/or large reactances tend to decrease the modal frequency. The modal damping coefficient is obtained as $$a=[X_{ab}X_{ac}/S](K_{1a}/M_1-K_{2a}/M_2)-[X_{ab}X_{bc}/S](K_{1b}/M_1-K_{2b}/M_2) \quad (20)$$

From this expression (20), some conclusions can be drawn:

1) Feedback from just one of the two machines is in general sufficient. Because the gains $K_{1a}$, $K_{2a}$, $K_{1b}$, $K_{2b}$ in equations (20) are scaled with the inverse inertias, the smallest machine, i.e. the one with the lowest inertia, should generally be chosen. (The underlying reason is that a smaller machine tends to swing with greater excursions during a disturbance than a larger machine.) In the following it is assumed, without loss of generality due to symmetry of the network structure, that $M_1 \leq M_2$, i.e. feedback from machine 1 is relied upon and $K_{2a}=K_{2b}=0$ are selected, giving $$\Delta P_a=K_{1a}\omega_1, \Delta P_b=K_{1b}\omega_1 \quad (21)$$

whereas equation (20) reduces to:

$$a=[X_{ab}(X_{ac}K_{1a}-X_{bc}K_{1b})]/(M_1S) \quad (22)$$

2) In case of unavailability of feedback from machine 1, feedback from machine 2 can be used instead (by setting $K_{2a}$ to $-K_{1a}$ and $K_{2b}$ to $-K_{1b}$ and then setting $K_{1a}$ and $K_{1b}$ to zero), with the same conclusions as above drawn, except for a reduction in a by the ratio $M_1/M_2$.

3) Substituting equation (21) in the relation $\Delta P_c=-(\Delta P_a+\Delta P_b)$ yields:

$$\Delta P_c=-(K_{1a}+K_{1b})\omega_1 \quad (23)$$

The effective modulation gain of terminal c is thus $K_{1c}=-(K_{1a}+K_{1b})$. The aforementioned assumption of identical modulation restrictions of all three terminals thus translates into the restrictions:

$$|K_{1a}| \leq K_{max},$$

$|K_{1b}| \leq K_{max}$, $|K_{1c}| = |K_{1a} + K_{1b}| \leq K_{max}$. (24)

Damping maximization consequently implies maximizing equation (22) subject to equation (24).

4) The selection $K_{1a} = -K_{1b} = K_{max}$ (25)

complies with equation (24) and maximizes the modal damping coefficient regardless of the parameter values, giving:

$a = X_{ab}(X_{ac} + X_{bc})K_{max}/(M_1 S)$ (26)

Since this results in $K_{1c} = 0$, it is a pairing of terminals a and b, and terminal c does not participate in the power modulation. Thus, with three embedded terminals, the two which are electrically closest to the oscillating machines should be paired. In the following this will be called a parallel damping.

5) Outage or unavailability of terminal a or terminal b can be alleviated by pairing b and c and a and c, respectively, at the expense of reduced damping: $a = X_{ab} X_{bc} K_{max}/(M_1 S)$ and $a = X_{ab} X_{ac} K_{max}/(M_1 S)$, respectively, is obtained. This will be called a perpendicular damping.

6) Perpendicular damping by tandem modulation of terminals a and b against terminal c, e.g., with $K_{1a} = K_{1b} = K_{max}/2$, may provide a less good strategy, since then:

$a = X_{ab}(X_{ac} - X_{bc})K_{max}/(2M_1 S)$ (27)

Zero damping results for $X_{ac} = X_{bc}$, i.e., when the network is symmetric. For this special case, tandem modulation can be regarded as terminals a and b being replaced with one terminal, located at or substantially at the electrical midpoint between the two machines.

Figure 5:
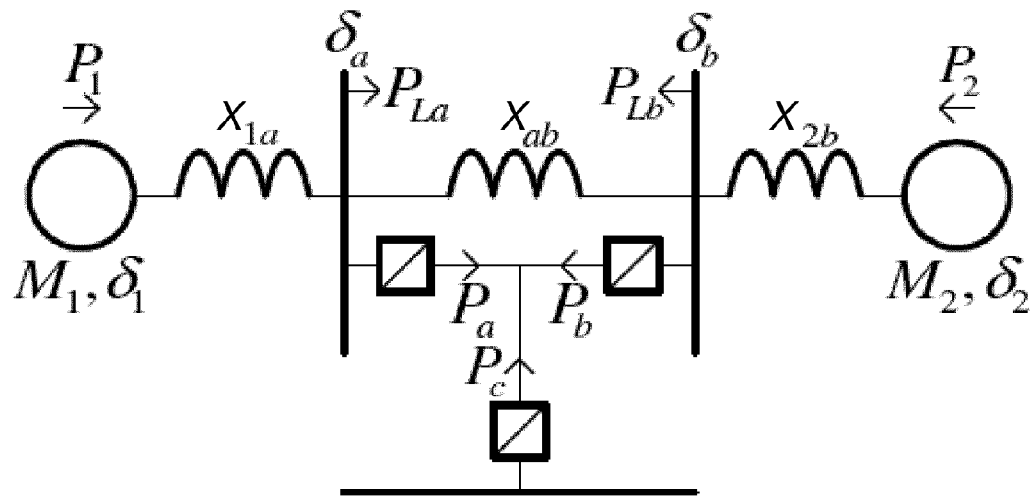

Referring now to FIG. 5, there is shown a schematic conceptual view of a power system for illustrating principles of other embodiments of the present invention. Compared to the power system depicted in FIG. 4, terminal c is not embedded, but is located in another network. The two terminals which are still embedded, a and b, form a parallel system. This should be a common situation, as HVDC transmissions often interconnect two asynchronous AC networks. The same model as described with reference to FIG. 4 above can be used by omitting equation (8) and letting $X_{ac} = X_{bc} = \infty$ in equations (6) and (7). Expressing the matrix elements in equation (12) in the system parameters yields:

$\omega_0 = (b_1 + b_2)^{0.5} = [V^2(M_1 + M_2)/(M_1 M_2 X)]^{0.5}$ (28)

where:

$X = X_{1a} + X_{ab} + X_{2b}$. (29)

Equation (28) is a special case of equation (18) with $X_{ac} = X_{bc} = \infty$. An expression for the modal damping coefficient a is obtained as $a = \{1/[(M_1+M_2)X]\} \cdot \{(M_2 X_{ab} + M_2 X_{ab} - M_1 X_{1a})(K_{1a}/M_1 - K_{2a}/M_2) - (M_1 X_{ab} + M_1 X_{1a} - M_2 X_{2b})(K_{1b}/M_1 - K_{2b}/M_2)\}$ (30)

Three general observations can be made:

1) As described with reference to FIG. 4 above, feedback from the smallest machine—i.e. machine 1—should be relied upon, cf. equation (20). In the following therefore $K_{2a} = K_{2b} = 0$.

2) Unlike equation (20), the reactances in the numerators of equation (30) are inertia scaled.

3) Unlike equation (20), pairing a and b, i.e. a parallel damping, may not be the best choice. Two special cases can be considered (referred to below as A and B).

A. Short distance to one machine, short-to-medium distance to the other; $X_{1a}$ small, $M_2 X_{2b} \leq M_1 X_{ab}$ Neglecting $X_{1a}$ in equation (30) yields $a = \{1/[(M_1+M_2)M_1 X]\} \cdot \{(M_2 X_{ab} + M_2 X_{ab})K_{1a} + (M_2 X_{ab} - M_1 X_{ab})K_{1b}\}$. (31)

To find the gain selection which maximizes a subject to equation (24), let $K_{1b} = -K_{1a} + K$. Then equation (31) transforms into:

$a = \{(M_1+M_2)X_{ab} K_{1a} - (M_1 X_{ab} - M_2 X_{ab})K\}/[(M_1+M_2)M_1 X]$. (32)

Since $M_1 X_{ab} - M_2 X_{2b} \geq 0$, the best choice is $K=0$, $K_{1a} = K_{max} \rightarrow K_{1b} = -K_{max}$, i.e. pairing of terminals a and b (parallel damping). The maximum modal damping coefficient is then:

$a = (X_{ab} K_{max})/(M_1 X)$. (33)

In addition, the following observations can be made:

Outage of terminal b can be alleviated by the alternative pairing of terminals a and c, still with $K_{1a} = K_{max}$, at the expense of reduced damping:

$a = [M_2(X_{ab} + X_{2b})K_{max}]/[(M_1+M_2)M_1 X] \leq [(M_2 X_{ab} + M_1 X_{ab})K_{max}]/[(M_1+M_2)M_1 X] = (X_{ab} K_{max})/(M_1 X)$. (34)

Yet, the closer $M_2 X_{2b}$ gets to $M_1 X_{ab}$, the less the reduction becomes, i.e. pairing of terminals a and c becomes more effective. For $M_2 X_{2b} = M_1 X_{ab}$, pairings of terminals a and b, and terminals a and c, are equally effective.

In case of outage or unavailability of terminal a, alternative usage of pairing of terminals b and c will result in decreased damping if $X_{2b}$ is relatively large, as can be seen in equation (31). When $M_2 X_{2b} = M_1 X_{ab}$, then the modal damping coefficient $a=0$.

B. Short distance to one machine, long distance to the other; $X_{1a}$ small, $M_2 X_{2b} > M_1 X_{ab}$ For this case, somewhat different observations are made compared to case A above. Pairing of terminals a and c, i.e. a perpendicular damping, is preferable. Letting $K_{1a} = K_{max}$ and $K_{1b} = 0$ in equation (31) in this case yields for modal damping coefficient a (cf. equation (33)):

$a = [M_2(X_{ab} + X_{2b})K_{max}]/[(M_1+M_2)M_1 X] > [(M_2 X_{ab} + M_1 X_{ab})K_{max}]/[(M_1+M_2)M_1 X] = (X_{ab} K_{max})/(M_1 X)$. (35)

Outage or unavailability of terminal a can be alleviated by using pairing of terminals b and c, with $K_{1b} = K_{max}$ at the expense of reduced damping:

$a = [(M_2 X_{2b} - M_1 X_{ab})K_{max}]/[(M_1+M_2)M_1 X] < [(M_1 X_{ab} + X_{2b})K_{max}]/[(M_1+M_2)M_1 X]$ (36)

Outage of terminal c can be alleviated by pairing of terminals a and b, with $K_{1a} = -K_{1b} = K_{max}$ at the expense of reduced damping; equation (33) is then obtained.

Figure 6:
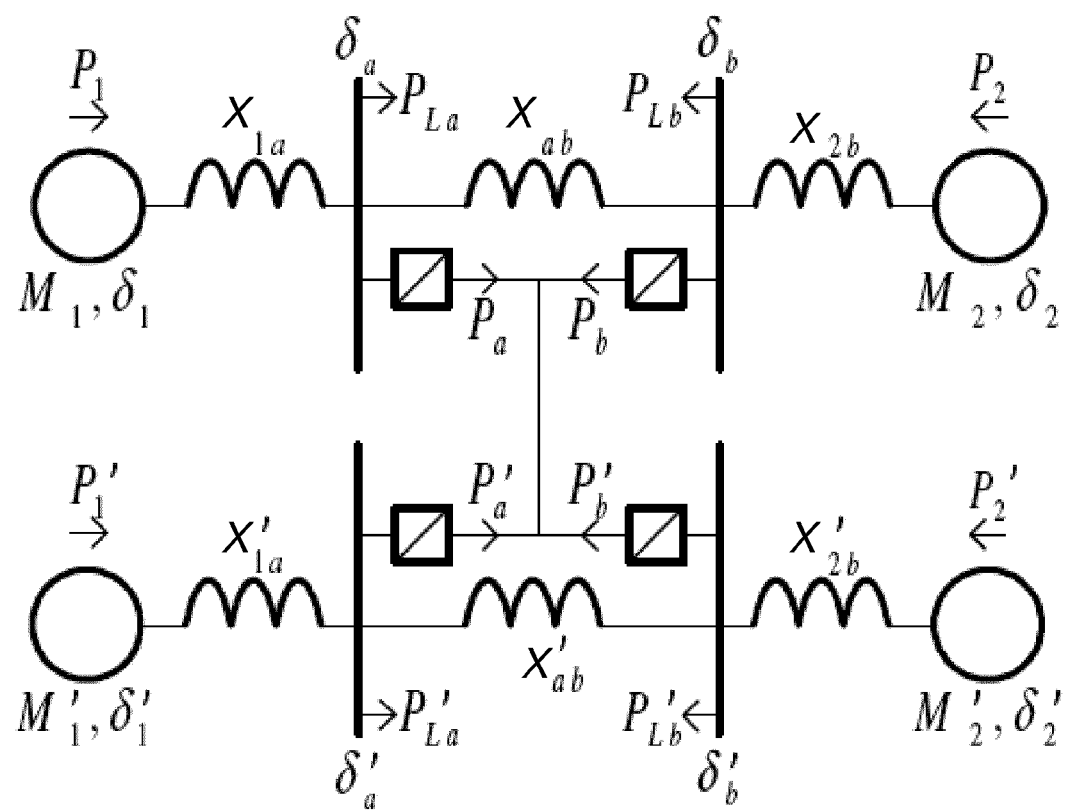

Referring now to FIG. 6, there is shown a schematic conceptual view of a power system for illustrating principles of yet other embodiments of the present invention.

Compared to the power systems depicted in FIGS. 4 and 5, FIG. 6 illustrates a four-terminal HVDC transmission. Terminals a and b are embedded in one two-machine network, whereas terminals a' and b' are embedded in another, similar two-machine network. First consider the top (unprimed) network. From the description above with reference to FIG. 5 it can be deduced that as long as $M_2 X_{2b} \leq M_1 X_{ab}$, pairing of terminals a and b, i.e. a parallel damping, is generally preferable. The active-power modulation then does not involve terminals a' and b', and consequently does not have an impact on the bottom (primed) network. If $M_2 X_{2b} > M_1 X_{ab}$, or in case of outage or unavailability of terminal a or terminal b, then terminal a or terminal b can to be modulated against terminal a' and/or terminal b', i.e. a perpendicular damping. If the modal frequencies of the two (top and bottom) networks are very different, it may not matter which combination that is used; a disturbance in the top network will be observed in the bottom network as a ringing, but the disturbance will not excite the bottom network's interarea mode. Similar modal frequencies may, on the other hand, bring negative effects. This can be prevented—or at least be reduced—by modulating active power of terminals a' and b' in tandem, so that they share the active-power modulation in a carefully selected way. Hence, what might have been a not so good choice of pairing in the case where all terminals are embedded in the power system, cf. equation (27), in this case becomes an asset. In equation (30) it is seen that for $K_{ea} = K_{2b} = 0$, the modal damping coefficient a vanishes when:

$$K_{1b} = K_{1a}\{[M_2(X_{ab}+X_{2b})-M_1X_{1a}]/[M_1(X_{ab}+X_{1a})-M_2X_{2b}]\}. \quad (37)$$

Suppose that the power-modulation gain of either terminal a or terminal b (depending on which is used in the pairing) is $K_1$; then selecting:

$$K_{1a'} = -K_1\{[M'_1(X'_{ab}+X'_{1a})-M'_2X'_{2b}]/[(M'_1+M'_2)X'_{ab}]\},$$
and $$K_{1b'} = -K_1\{[M'_2(X'_{ab}+X'_{2b})-M'_1X'_{1a}]/[(M'_1+M'_2)X'_{ab}]\} \quad (38)$$

gives an effective power-modulation gain of terminals a' and b' of $-K_1$, while equation (30) is made zero, i.e. the interarea mode of the bottom network is unaffected. A similar strategy of course can be applied for the bottom network vs. the top network.

Some general conclusions with respect to the embodiments of the present invention illustrated in FIGS. 4-6 may be drawn. Active (and/or possibly reactive) power modulation or control by pairing of two terminals is generally preferable to a combination involving three or more terminals, particularly if this is made by modulating the power of one terminal and letting the primary controls handle the resulting power imbalance between the terminals. If all terminals are embedded in the same AC network, then the terminals which are closest to the centers of the areas which oscillate against each other may be paired (i.e. so called a parallel damping). The same still holds for an AC network with at least one external terminal, provided that the embedded terminals are located in relative symmetry to the oscillating areas. If at least one terminal is external and the embedded terminals are located with a relatively high degree of asymmetry relatively to the oscillating areas, then one (or possibly two or more) of the external terminals may be paired with the selected embedded terminal which is closest to either one of the oscillating areas (i.e. so called perpendicular damping). If there are two or more external terminals, two (or more) of them can be modulated in tandem against the selected embedded terminal in a perpendicular damping in order to prevent, or reduce, the induction of oscillations in the external AC network. Outage or unavailability of one terminal in a preferred of pairing of terminals can generally be alleviated by using another pairing of terminals, however possibly at the expense of reduced damping. In general, speed feedback (and/or possibly any other type of feedback) from a machine in the area with the lowest aggregated, or total, inertia may be used for the power modulation or control. The above-mentioned conclusions are believed to be valid independent of the operating point, i.e. of the load flow.

In conclusion, embodiments of the present invention disclose using a pairing or pairings of terminals in a DC power system including a plurality of terminals to implement power oscillation damping (POD), where the DC power system is connectable to at least one AC power system. The active and/or reactive power of the terminals in the pairing may be controlled or modulated in a similar manner such that no power imbalance in the DC power system is created. For example, POD may be implemented by means of active and/or reactive power modulation by pairing two terminals in the DC power system such that their active and/or reactive powers are controlled or modulated in the same or substantially the same manner or identically but with the opposite sign.

While the present invention has been illustrated and described in detail in the appended drawings and the foregoing description, such illustration and description are to be considered illustrative or exemplifying and not restrictive; the present invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measures cannot be used to advantage. Any reference signs in the claims should not be construed as limiting the scope.

The invention claimed is:

1. A method in a DC power system comprising a plurality of terminals, each terminal being coupled to at least one other terminal and configured to convey power to and/or receive power from the at least one other terminal, and each terminal being selectively controllable with respect to power conveyed from the terminal, the DC power system being connectable to at least one AC power system comprising a plurality of power generating machines, the DC power system being adapted to convey power between at least two locations in the at least one AC power system, the method comprising, on a condition that the at least one AC power system comprises at least two different regions wherein the power generating machines in the respective regions at least potentially can oscillate against each other:

determining at least one pairing of two subsets of the plurality of terminals, each subset including at least one terminal, by means of a model of dynamics of a power system representative of at least a portion of the DC power system and the at least two different regions of the at least one AC power system, where predetermined positions are representative of locations of the respective regions and the model is based on reactance between each of the plurality of terminals and the positions representative of the locations of the respective regions and the locations of the plurality of terminals relatively to the at least one AC power system;

receiving a first signal indicative of at least one parameter of a power generating machine in at least one of the regions, the at least one parameter of the power generating machine governing the power generation capability of the power generating machine; and controlling power conveyed from at least one subset of the two subsets of terminals based on the first signal such that a difference between the total power output from the respective subsets of terminals complies with a selected power difference criteria, thereby damping any oscillation between the power generating machines in the respective regions.

2. The method according to claim 1, comprising controlling power conveyed from both of the two subsets of terminals such that a difference between the total power output from the respective subsets of terminals complies with a selected power difference criteria.

3. The method according to claim 1, comprising controlling power conveyed from a first subset of the two subsets of terminals and wherein at least one terminal in the other, second subset of the two subsets of terminals is configured to at least momentarily control DC voltage in the DC power system such that controlling power conveyed from the first subset of the two subsets of terminals causes power to flow along a route in the DC power system between the two subsets of terminals.

4. The method according to claim 3, wherein the at least one terminal in the second subset of the two subsets of terminals is configured to control DC voltage in the DC power system on a condition that a magnitude of a difference between the DC voltage in the DC power system and a predefined DC voltage reference value does not exceed a DC voltage threshold value.

5. The method according to claim 4, wherein at least one other terminal, which is other than a terminal included in the first subset and said at least one terminal in the second subset, is configured to selectively adjust its output DC voltage responsive to change in power conveyed from the at least one other terminal, or vice versa, and wherein, on a condition that a magnitude of a difference between the DC voltage in the DC power system and the predefined DC voltage reference value exceeds the DC voltage threshold value, the at least one other terminal is configured to adjust its output DC voltage responsive to change in power conveyed from the at least one other terminal, or vice versa.

6. The method according to claim 1, wherein the model is based on a state space model and/or a frequency domain model.

7. The method according to claim 1, wherein determination of the at least one pairing of two subsets of the plurality of terminals comprises:
    determining a plurality of possible pairings of two subsets of the plurality of terminals;
    for each of the possible pairings of two subsets of the plurality of terminals, determining a modal residue vector corresponding to a selected mode of oscillation between the power generating machines in the respective regions; and
    comparing the determined modal residue vectors.

8. The method according to claim 1, wherein the pairing of the two subsets is determined by means of selecting the two subsets such that reactance between at least one terminal in at least one of the subsets and the positions representative of the locations of the respective regions is a minimum as compared to reactance between each of the plurality of terminals and the positions representative of the locations of the respective regions.

9. The method according to claim 1, wherein, on a condition that all terminals are included in a same of the at least one AC power system, determining at least one pairing of two subsets of the plurality of terminals comprises:
    selecting at least a first terminal to be included in one of the two subsets and a second terminal to be included in the other one of the two subsets, wherein reactance between the first terminal and the position representative of the location of one of the respective regions is a minimum as compared to reactance between the other terminals and the position representative of the location of the one of the respective regions, and reactance between the second terminal and the position representative of the locations of the other one of the respective regions is a minimum as compared to reactance between the other terminals and the position representative of the location of the other one of the respective regions.

10. The method according to claim 1, wherein the plurality of terminals comprises at least three terminals and wherein, on a condition that at least two terminals are included in a same of the at least one AC power system and at least one other terminal is located externally with respect to the at least one AC power system, and on a condition that the respective reactances between the at least two terminals included in a same of the at least one AC power system and the location of one of the respective regions and the respective reactances between the at least two terminals included in a same of the at least one AC power system and the position representative of the locations of the other one of the respective regions comply with a selected similarity criteria, determining at least one pairing of two subsets of the plurality of terminals comprises:
    selecting at least a first terminal to be included in one of the two subsets and a second terminal to be included in the other one of the two subsets, the first terminal and the second terminals being included in the same of the at least one AC power system, wherein reactance between the first terminal and the position representative of the location of one of the respective regions is a minimum as compared to reactance between the other terminals and the position representative of the location of the one of the respective regions, and reactance between the second terminal and the position representative of the locations of the other one of the respective regions is a minimum as compared to reactance between the other terminals and the position representative of the location of the other one of the respective regions.

11. The method according to claim 1, wherein the plurality of terminals comprises at least three terminals and wherein, on a condition that at least two terminals are included in a same of the at least one AC power system and at least one other terminal is located externally with respect to the at least one AC power system, and on a condition that the respective reactances between the at least two terminals included in a same of the at least one AC power system and the location of one of the respective regions and the respective reactances between the at least two terminals included in a same of the at least one AC power system and the position representative of the locations of the other one of the respective regions do not comply with a selected similarity criteria, determining at least one pairing of two subsets of the plurality of terminals comprises:
    selecting at least a first terminal to be included in one of the two subsets and a second terminal to be included in the other one of the two subsets, the first terminal being one of the at least two terminals which are included in the same of the at least one AC power system and the second terminal being one of the at least one other terminal which is located externally with respect to the at least one AC power system.

12. The method according to claim 11, wherein the plurality of terminals comprises at least four terminals and wherein, on a condition that at least two terminals are included in a same of the at least one AC power system and at least two other terminals are located externally with respect to the at least one AC power system, determining at least one pairing of two subsets of the plurality of terminals comprises:

selecting a third terminal to be included together with the second terminal in the other one of the two subsets, the third terminal being one other of the at least two other terminals which are located externally with respect to the at least one AC power system.

13. The method according to claim 10, wherein the similarity criteria is that the respective reactances between the at least two terminals included in a same of the at least one AC power system and the location of one of the respective regions correspond to the respective reactances between the at least two terminals included in a same of the at least one AC power system and the position representative of the locations of the other one of the respective regions.

14. The method according to claim 1, wherein the determining of at least one pairing of two subsets of the plurality of terminals comprises determining a plurality of possible pairings of two subsets of the plurality of terminals, the method further comprising:

assessing by means of at least one power system simulation model performance in damping of any oscillation between the power generating machines in the respective regions by means of controlling power conveyed from the at least one subset of the two subsets of terminals of each possible pairing such that a difference between the total power output from the respective subsets of terminals complies with the selected power difference criteria;

on basis of the assessment, ranking the plurality of possible pairings of two subsets of the plurality of terminals according to assessed performance in damping of any oscillation between the power generating machines in the respective regions by means of controlling power conveyed from the at least one subset of the two subsets of terminals of each possible pairing.

15. The method according to claim 1, wherein the received signal is indicative of at least one parameter of a power generating machine in one of the regions for which the aggregated inertia of the power generating machines in the region is a minimum with respect to the aggregated inertias of the power generating machines in the respective regions.

16. The method according to claim 1, wherein the at least one parameter comprises at least one of speed and/or frequency or rotor angle.

17. The method according to claim 1, further comprising receiving a second signal indicative of at least one operational parameter of at least one terminal in at least one of the subsets, wherein controlling power conveyed from the at least one subset of the two subsets of terminals is based on the second signal.

18. The method according to claim 1, wherein each terminal of the plurality of terminals is selectively controllable with respect to active and/or reactive power conveyed from the terminal, and wherein controlling power conveyed from the at least one subset of the two subsets of terminals such that a difference between the total power output from the respective subsets of terminals complies with a selected power difference criteria comprises controlling active and/or reactive power conveyed from the at least one subset of the two subsets of terminals such that a difference between the total active and/or reactive power output from the respective subsets of terminals complies with a selected active and/or reactive power difference criteria.

19. The method according to claim 1, wherein the selected power difference criteria is that the magnitudes of the total power output from the respective subsets of terminals are the same.

20. A processing unit for controlling a DC power system comprising a plurality of terminals, each terminal being coupled to at least one other terminal and configured to convey power to and/or receive power from the at least one other terminal, and each terminal being selectively controllable with respect to power conveyed from the terminal, the DC power system being connectable to at least one AC power system comprising a plurality of power generating machines, the DC power system being adapted to convey power between at least two locations in the at least one AC power system, the processing unit being configured to, on a condition that the at least one AC power system comprises at least two different regions wherein the power generating machines in the respective regions at least potentially can oscillate against each other:

determine at least one pairing of two subsets of the plurality of terminals, each subset including at least one terminal, by means of a model of dynamics of a power system representative of at least a portion of the DC power system and the at least two different regions of the at least one AC power system, where predetermined positions are representative of locations of the respective regions and the model is based on reactance between each of the plurality of terminals and the positions representative of the locations of the respective regions and the locations of the plurality of terminals relatively to the at least one AC power system;

receive a first signal indicative of at least one parameter of a power generating machine in at least one of the regions, the at least one parameter of the power generating machine governing the power generation capability of the power generating machine; and control power conveyed from at least one subset of the two subsets of terminals based on the first signal such that a difference between the total power output from the respective subsets of terminals complies with a selected power difference criteria, thereby damping any oscillation between the power generating machines in the respective regions.

21. A computer program product adapted to be executed in a processing unit configured to control DC power system comprising a plurality of terminals, each terminal being coupled to at least one other terminal and configured to convey power to and/or receive power from the at least one other terminal, and each terminal being selectively controllable with respect to power conveyed from the terminal, the DC power system being connectable to at least one AC power system comprising a plurality of power generating machines, the DC power system being adapted to convey power between at least two locations in the at least one AC power system, the computer program product comprising a non-transitory computer-readable medium carrying computer program code configured to, when executed in the processing unit, and on a condition that the at least one AC power system comprises at least two different regions wherein the power generating machines in the respective regions at least potentially can oscillate against each other:

determine at least one pairing of two subsets of the plurality of terminals, each subset including at least one terminal, by means of a model of dynamics of a power system representative of at least a portion of the DC power system and the at least two different regions of the at least one AC power system, where predetermined positions are representative of locations of the respective regions and the model is based on reactance between each of the plurality of terminals and the positions representative of the locations of the respective regions and the locations of the plurality of terminals relatively to the at least one AC power system;

receive a first signal indicative of at least one parameter of a power generating machine in at least one of the regions, the at least one parameter of the power generating machine governing the power generation capability of the power generating machine; and control power conveyed from at least one subset of the two subsets of terminals based on the first signal such that a difference between the total power output from the respective subsets of terminals complies with a selected power difference criteria, thereby damping any oscillation between the power generating machines in the respective regions.

22. A DC power system comprising:

a plurality of terminals, each terminal being coupled to at least one other terminal and configured to convey power to and/or receive power from the at least one other terminal, and each terminal being selectively controllable with respect to power conveyed from the terminal; and a processing unit, wherein the DC power system is connectable to at least one AC power system comprising a plurality of power generating machines, the DC power system being adapted to convey power between at least two locations in the at least one AC power system, wherein the processing unit is configured to, on a condition that the at least one AC power system comprises at least two different regions wherein the power generating machines in the respective regions at least potentially can oscillate against each other:

determine at least one pairing of two subsets of the plurality of terminals, each subset including at least one terminal, by means of a model of dynamics of a power system representative of at least a portion of the DC power system and the at least two different regions of the at least one AC power system, where predetermined positions are representative of locations of the respective regions and the model is based on reactance between each of the plurality of terminals and the positions representative of the locations of the respective regions and the locations of the plurality of terminals relatively to the at least one AC power system;

receive a first signal indicative of at least one parameter of a power generating machine in at least one of the regions, the at least one parameter of the power generating machine governing the power generation capability of the power generating machine; and control power conveyed from at least one subset of the two subsets of terminals based on the first signal such that a difference between the total power output from the respective subsets of terminals complies with a selected power difference criteria, thereby damping any oscillation between the power generating machines in the respective regions.

23. The DC power system according to claim 22, wherein the DC power system comprises a High Voltage Direct Current, HVDC, power transmission system.

24. The DC power system according to claim 22, wherein the DC power system comprises a DC power grid.

* * * * *